(12) United States Patent
Bak et al.

(10) Patent No.: US 12,385,433 B2
(45) Date of Patent: Aug. 12, 2025

(54) GAS TURBINE PLANT WITH AMMONIA DECOMPOSITION SYSTEM

(71) Applicant: DOOSAN ENERBILITY CO., LTD., Changwon-si (KR)

(72) Inventors: Byoung Gu Bak, Suwon-si (KR); Tae Woo Kim, Yongin-si (KR); Hong Geun Ha, Yongin-si (KR)

(73) Assignee: Doosan Enerbility Co., Ltd., Changwon-si (KR)

( * ) Notice: Subject to any disclaimer, the term of this patent is extended or adjusted under 35 U.S.C. 154(b) by 0 days.

(21) Appl. No.: 18/657,469

(22) Filed: May 7, 2024

(65) Prior Publication Data

US 2024/0401524 A1 Dec. 5, 2024

(30) Foreign Application Priority Data

May 30, 2023 (KR) .......................... 10-2023-0069527
Jul. 12, 2023 (KR) .......................... 10-2023-0090607

(51) Int. Cl.
*F02C 6/18* (2006.01)
*C01B 3/04* (2006.01)
*F01K 23/10* (2006.01)
*F01N 3/10* (2006.01)

(52) U.S. Cl.
CPC ................ *F02C 6/18* (2013.01); *C01B 3/047* (2013.01); *F01K 23/10* (2013.01); *F01N 3/10* (2013.01); *F05D 2220/60* (2013.01)

(58) Field of Classification Search
CPC ............. F02C 6/18; F01K 23/10; C01B 3/047
See application file for complete search history.

(56) References Cited

U.S. PATENT DOCUMENTS

| 5,852,925 | A | 12/1998 | Prasad et al. | |
|---|---|---|---|---|
| 6,773,230 | B2 | 8/2004 | Bather et al. | |
| 7,854,591 | B2 | 12/2010 | Liang | |
| 11,156,168 | B2 | 10/2021 | Nose | |
| 11,679,977 | B2 | 6/2023 | Al-Huwaider | |
| 11,912,574 | B1 | 2/2024 | Jo | |
| 11,939,915 | B2 | 3/2024 | Uechi | |
| 2007/0214766 | A1 | 9/2007 | Obana | |
| 2018/0355794 | A1* | 12/2018 | Bulat | F02C 3/28 |
| 2019/0084831 | A1* | 3/2019 | Andersen | F02C 3/28 |
| 2019/0107048 | A1* | 4/2019 | Bulat | F02C 3/22 |

(Continued)

FOREIGN PATENT DOCUMENTS

| CN | 119222016 A | 12/2024 |
|---|---|---|
| EP | 1091092 A2 | 11/2001 |

(Continued)

OTHER PUBLICATIONS

European Search Report, in Corresponding European Application No. 24195422.1-1004 Dated Month Mar. 2025.

*Primary Examiner* — Katheryn A Malatek
(74) *Attorney, Agent, or Firm* — Shook, Hardy & Bacon L.L.P.

(57) ABSTRACT

The present disclosure relates to a gas turbine plant that decomposes ammonia and supplies it as fuel to a combustor of a gas turbine. The gas turbine plant supplies sufficient heat to the ammonia in order to thermally decompose the ammonia effectively, and separates the residual ammonia present in the decomposition gas and supplies it to a combustor of the gas turbine.

20 Claims, 10 Drawing Sheets

(56) References Cited

U.S. PATENT DOCUMENTS

| | | |
|---|---|---|
| 2020/0024987 A1 | 1/2020 | Bunker |
| 2020/0032676 A1* | 1/2020 | Nose .................... F23R 3/36 |
| 2020/0332713 A1 | 10/2020 | Propheter-Hinckley et al. |
| 2021/0332759 A1 | 10/2021 | Smith |
| 2022/0099021 A1* | 3/2022 | Uechi .................... F01K 7/18 |
| 2022/0154646 A1 | 5/2022 | Araki |
| 2022/0162989 A1* | 5/2022 | Cocks .................... F23R 3/36 |
| 2022/0162999 A1* | 5/2022 | Cocks .................... C01B 3/047 |
| 2022/0299205 A1 | 9/2022 | MacDonald |
| 2023/0129294 A1 | 4/2023 | Cocks |
| 2023/0313735 A1 | 10/2023 | Smith |
| 2023/0407784 A1 | 12/2023 | Takeishi |
| 2024/0019124 A1 | 1/2024 | Ito |
| 2024/0068416 A1 | 2/2024 | Hagita |
| 2024/0093639 A1 | 3/2024 | Ikeda |
| 2024/0117763 A1 | 4/2024 | Ito |
| 2024/0167417 A1 | 5/2024 | Lin |
| 2024/0183310 A1 | 6/2024 | Uechi |
| 2024/0328358 A1 | 10/2024 | Barth |

FOREIGN PATENT DOCUMENTS

| | | |
|---|---|---|
| EP | 4227501 A1 | 8/2023 |
| JP | 2948351 A | 9/1999 |
| JP | 2015021499 A | 2/2015 |
| JP | 2016085189 A | 5/2016 |
| JP | 2018076794 A | 5/2018 |
| JP | 2020147478 A | 9/2020 |
| JP | 2020148183 A | 9/2020 |
| KR | 20130071099 A | 6/2013 |
| KR | 20140001773 A | 7/2014 |
| KR | 20210096274 A | 8/2021 |
| KR | 20210121192 A | 10/2021 |
| KR | 20220141943 A | 10/2022 |
| KR | 20230060372 A | 5/2023 |
| WO | 2023162600 A1 | 8/2023 |
| WO | 2024100987 A1 | 5/2024 |

* cited by examiner

GAS TURBINE PLANT WITH AMMONIA DECOMPOSITION SYSTEM

CROSS-REFERENCE TO RELATED APPLICATIONS

The present application claims priority to Korea Patent Application No. 10-2023-0069527, filed May 30, 2023, and Korea Patent Application No. 10-2023-0090607, filed Jul. 12, 2023, the entire contents of which are incorporated herein for all purposes by this reference.

FIELD

The present disclosure relates to a gas turbine plant with an ammonia decomposition system and more particularly to a gas turbine plant which decomposes ammonia and supplies it as fuel to a combustor of the gas turbine.

BACKGROUND

For the purpose of reducing the emission amount of carbon dioxide in order to preserve global environment, it is a promising option to use hydrogen as a fuel which does not emit carbon dioxide even when combusted. However, compared to a fuel such as liquefied natural gas which is widely used as a fuel for a gas turbine, hydrogen is not easy to transport or store. Therefore, it is being considered that ammonia that can be converted to hydrogen is used as a fuel.

Japanese Patent No. 2948351 discloses a gas turbine plant equipped with a decomposition device that heats ammonia and decomposes it into hydrogen and nitrogen. The decomposition device of the gas turbine plant heats ammonia by performing heat exchange between liquid ammonia with pressure increased by a pressure pump and exhaust gas discharged from the gas turbine, thereby thermally decomposing the ammonia into decomposition gas containing hydrogen and nitrogen. This decomposition gas is supplied as it is to a combustor of the gas turbine.

However, the liquid ammonia may not be sufficiently heated by the exhaust gas. In this case, a large amount of ammonia in addition to hydrogen and nitrogen often remains in the decomposition gas. When the decomposition gas is supplied to the combustor of the gas turbine and the residual ammonia is combusted, there is a problem that a large amount of nitrogen oxides (NOx) is generated.

SUMMARY

The purpose of the present disclosure is to provide a gas turbine plant that decomposes ammonia and supplies it as fuel to a combustor of a gas turbine. The gas turbine plant supplies sufficient heat to the ammonia in order to thermally decompose the ammonia effectively, and separates the residual ammonia present in the decomposition gas and supplies it to a combustor of the gas turbine.

The technical problem to be overcome in this document is not limited to the above-mentioned technical problems. Other technical problems not mentioned can be clearly understood from those described below by a person having ordinary skill in the art.

One embodiment is a gas turbine plant with an ammonia decomposition system. The gas turbine plant includes: a storage tank configured to store liquid ammonia; a supply pump configured to supply the liquid ammonia of the storage tank; a preheater configured to preheat the liquid ammonia supplied by the supply pump; a vaporizer configured to vaporize the liquid ammonia preheated by the preheater; a superheater configured to superheat the gaseous ammonia vaporized by the vaporizer; a decomposition reactor configured to thermally decompose the gaseous ammonia superheated by the superheater; a separator configured to separate residual ammonia from the decomposition gas decomposed by the decomposition reactor; a first combustor configured to generate combustion gas in such a way as to supply heat to the decomposition reactor; and a heat exchanger configured to recover the heat from the combustion gas that has passed through the decomposition reactor. Synthesis gas consisting of hydrogen and nitrogen with the residual ammonia removed by the separator is supplied to a second combustor of a gas turbine.

Exhaust gas that is discharged from the gas turbine may be supplied to a heat recovery steam generator. The combustion gas that has passed through the heat exchanger may join the exhaust gas within the heat recovery steam generator.

The combustion gas may join upstream of a selective catalytic reduction device of the heat recovery steam generator.

The gas turbine plant may further include a blower which increases a pressure of the combustion gas which has passed through the decomposition reactor and the heat exchanger, and supplies the combustion gas to the heat recovery steam generator.

The heat exchanger may include a plurality of heat exchangers, and the plurality of heat exchangers may be arranged in series downstream of the decomposition reactor in a flow of the combustion gas.

Exhaust gas that is discharged from the gas turbine may be supplied to a heat recovery steam generator. Steam generated by heat of the exhaust gas in the heat recovery steam generator may be supplied to a steam turbine, may drive the steam turbine, and then may flow into a condenser. Water condensed in the condenser may be supplied back to the heat recovery steam generator. The water extracted from downstream of the condenser or from the heat recovery steam generator may be supplied to the heat exchanger and may be supplied with heat from the combustion gas, and then may be recovered to the heat recovery steam generator or upstream of the steam turbine.

Natural gas, together with the synthesis gas, may be supplied to the second combustor.

The synthesis gas or the natural gas may be supplied to the heat exchanger before being supplied to the second combustor and may be heated by the combustion gas.

A heat transfer fluid may absorb the heat from the combustion gas in the heat exchanger and may supply the heat to the synthesis gas or to the natural gas.

District heating water may be supplied to the heat exchanger and may be heated by the combustion gas.

Air compressed by a compressor of the gas turbine may be supplied to the heat exchanger before being supplied to the second combustor and may be heated by the combustion gas.

The gas turbine plant may further include a booster compressor which increases a pressure of compressed air heated in the heat exchanger.

A portion of exhaust gas discharged from the gas turbine may be branched and supplied to the first combustor.

A portion of the synthesis gas may be supplied to the first combustor and may be combusted. A synthetic gas discharge line through which the synthetic gas discharged from the separator flows may branch into a first branch line connected to the first combustor and a second branch line connected to the second combustor. A bypass line may be provided, which extends from the synthesis gas discharge line to the second branch line. A buffer tank may be provided in the bypass line.

A blower which increases a pressure of the synthetic gas may be provided in the bypass line.

A flow control valve (FCV) may be installed in the first branch line and upstream and downstream of the buffer tank in the bypass line, respectively.

A portion of the synthesis gas may be supplied to the first combustor and may be combusted. A synthetic gas discharge line through which the synthetic gas discharged from the separator flows may branch into a first branch line connected to the first combustor and a second branch line connected to the second combustor. A bypass line may be provided, which extends from the synthesis gas discharge line to the first branch line. A buffer tank may be provided in the bypass line.

A pressure control valve (PCV) may be installed in the first branch line and upstream of the buffer tank in the bypass line, respectively.

A flow control valve (FCV) may be installed in the first branch line and upstream and downstream of the buffer tank in the bypass line, respectively.

Another embodiment is a gas turbine plant with an ammonia decomposition system. The gas turbine plant includes: a storage tank configured to store liquid ammonia; a supply pump configured to supply the liquid ammonia of the storage tank; a preheater configured to preheat the liquid ammonia supplied by the supply pump; a vaporizer configured to vaporize the liquid ammonia preheated by the preheater; a superheater configured to superheat the gaseous ammonia vaporized by the vaporizer; a decomposition reactor configured to thermally decompose the gaseous ammonia superheated by the superheater; a separator configured to separate residual ammonia from the decomposition gas decomposed by the decomposition reactor; and a first combustor configured to generate combustion gas in such a way as to supply heat to the decomposition reactor. Synthesis gas consisting of hydrogen and nitrogen with the residual ammonia removed by the separator is supplied to a second combustor of a gas turbine.

Exhaust gas that is discharged from the gas turbine is supplied to a heat recovery steam generator. The combustion gas joins the exhaust gas within the heat recovery steam generator.

According to the embodiment, the ammonia decomposition system includes the preheater, the vaporizer, and the superheater, which heat ammonia prior to the decomposition reactor. The combustion gas generated by the first combustor supplies heat to the decomposition reactor. Accordingly, sufficient heat can be supplied to the ammonia and the ammonia can be thermally decomposed effectively at a high temperature.

Also, the heat exchanger for recovering the heat from the combustion gas that has passed through the decomposition reactor is included. Accordingly, the heat of the combustion gas, which remains after being used in the decomposition reactor can be effectively used. Particularly, when water extracted from the heat recovery steam generator is heated by using the heat which remains after being used in the decomposition reactor, the power generation efficiency can be improved. When the synthesis gas, natural gas, or compressed air which is supplied to the second combustor is heated, the amount of fuel used for a target temperature of the combustion gas in the second combustor can be reduced.

Also, as the combustion gas joins the exhaust gas within the heat recovery steam generator, in particular, as the combustion gas joins upstream of the selective catalytic reduction (SCR) device of the heat recovery steam generator, the heat remaining after being used in the decomposition reactor can be recovered to the heat recovery steam generator. Not only an additional stack for the combustion gas but also an additional selective catalyst reduction device is not required.

Also, the buffer tank is included in order to maintain the amount of fuel supplied to the first combustor and the second combustor constant. Therefore, when the amount of fuel produced by the decomposition reactor is excessive, the fuel may be stored in the buffer tank, and when the amount of fuel produced by the decomposition reactor is insufficient, the fuel stored in the buffer tank may be supplied to the first combustor or the second combustor.

The effect of the present disclosure is not limited to the above effects and should be construed as including all the effects that can be inferred from the configuration of the present disclosure disclosed in the detailed description or claims of the present disclosure.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Hereinafter, preferable embodiments of a gas turbine plant with an ammonia decomposition system will be described with reference to accompanying drawings.

Also, the below-mentioned terms are defined in consideration of the functions in the present disclosure and may be changed according to the intention of users or operators or custom. The following embodiments do not limit the scope of the present disclosure and are merely exemplary of the components presented in the claims of the present disclosure.

Parts irrelevant to the description will be omitted for a clear description of the present disclosure. The same or similar reference numerals will be assigned to the same or similar components throughout this specification. Throughout this specification, when it is mentioned that a portion "includes" an element, it means that the portion does not exclude but further includes other elements unless there is a special opposite mention.

First, a gas turbine plant including an ammonia decomposition system according to an embodiment of the present disclosure will be described with reference to FIG. 1.

The gas turbine plant according to the embodiment generally includes an ammonia decomposition system 10, a gas turbine 20, a heat recovery steam generator (HRSG) 30, a steam turbine 40, and a condenser 50.

The ammonia decomposition system 10 includes a storage tank 100, a supply pump 120, a preheater 200, a vaporizer 300, a superheater 400, a decomposition reactor 500, a separator 600, and a first combustor 700.

The gas turbine 20 includes a compressor 22 for compressing air to high pressure, a second combustor 24 for mixing the air compressed by the compressor 22 with fuel and for combusting, and a turbine 26 for generating power while rotating turbine blades by using high-temperature and high-pressure combustion gas discharged from the second combustor 24.

In the embodiment of the present disclosure, synthesis gas based on hydrogen decomposed in the ammonia decomposition system 10 as a main component is supplied as fuel for the second combustor 24. Moreover, natural gas (NG) and the synthesis gas are supplied to the second combustor 24 and mixed and combusted. However, the present invention is not limited to this and, needless to say, only the synthesis gas can be supplied as fuel for the second combustor 24.

Exhaust gas (EG) discharged from the turbine 26 of the gas turbine 20 is supplied to the heat recovery steam generator 30 and vaporizes water into steam within the heat recovery steam generator 30. The steam generated by heat of the exhaust gas (EG) in the heat recovery steam generator 30 is supplied to the steam turbine 40 and drives the steam turbine to produce electric power. After driving the steam turbine 40, the steam flows into the condenser 50 and is condensed by cooling water, and the water condensed in the condenser 50 is supplied back to the heat recovery steam generator 30. There may be provided a condensate pump 52 which supplies the water condensed in the condenser 50 to the heat recovery steam generator 30.

Hereinafter, each component of the ammonia decomposition system 10 will be described in detail. FIG. 1 shows a flow of ammonia or ammonia-decomposed gas passing through the components of the ammonia decomposition system 10, and adjacent components will be connected to each other through connection pipes, etc.

The storage tank 100 stores liquid ammonia, and the supply pump 120 increases the pressure of the liquid ammonia of the storage tank 100 and supplies the liquid ammonia to the preheater 200.

Subsequently, the preheater 200, the vaporizer 300, and the superheater 400 are configured to vaporize and heat the liquid ammonia prior to the decomposition reactor 500. Specifically, the preheater 200 preheats the liquid ammonia supplied by the supply pump 120. The vaporizer 300 vaporizes the liquid ammonia preheated by the preheater 200. The superheater 400 superheats the gaseous ammonia vaporized by the vaporizer 300.

As one example, when the supply pump 120 increases the pressure of the liquid ammonia to 40 atm, a boiling point of the ammonia at 40 atm is around 100° C. In this case, the preheater 200 heats the liquid ammonia to below the boiling point, and the vaporizer 300 heats the liquid ammonia to the boiling point and generates gaseous ammonia. The superheater 400 additionally heats the gaseous ammonia.

The decomposition reactor 500 thermally decomposes the gaseous ammonia superheated by the superheater 400 and generates decomposition gas (DG) containing hydrogen, nitrogen, and residual ammonia. A catalyst that promotes the thermal decomposition of the ammonia may be filled in the decomposition reactor 500. The catalyst has a catalyst component that activates a decomposition reaction, and a carrier that supports the catalyst component. An example of the catalyst component includes particles of precious metal such as Ru, etc., and metal particles including transition metals such as Ni, Co, and Fe, etc. The carrier includes a metal oxide such as Al2O3, ZrO2, Pr2O3, La2O3, MgO, etc. The catalyst is not limited to the catalysts exemplified above as long as the catalyst activates the decomposition reaction of ammonia.

The separator 600 separates residual ammonia from the decomposition gas (DG) decomposed by the decomposition reactor 500. Then, the residual ammonia is removed in the separator 600, the synthesis gas (SG) consisting of hydrogen and nitrogen is supplied to the second combustor 24 of the gas turbine. Here, the residual ammonia separated by the separator 600 may be mixed with the gaseous ammonia vaporized by the vaporizer 300 and may be supplied to the superheater 400. (see FIG. 8) Since ammonia is highly soluble in water, the separator 600 can remove the residual ammonia by dissolving the residual ammonia in water. Also, ammonia is easier to evaporate than water. Therefore, when ammonia water that is obtained by dissolving the residual ammonia in water is heated, gaseous ammonia can be separated again.

Here, a reaction temperature for the thermal decomposition of the ammonia (depending on the catalyst, generally 400° C. to 700° C.) is much higher than a boiling point of ammonia. Therefore, the decomposition reactor 500 requires a relatively high temperature heat source. To this end, the ammonia decomposition system 10 includes the first combustor 700 that generates combustion gas (CG) such that heat is supplied to the decomposition reactor 500. In the embodiment, the combustion gas (CG) generated by the first combustor 700 supplies heat while passing through the decomposition reactor 500 and a below-described heat exchanger 800. Also, in some cases, the combustion gas (CG) may pass through the preheater 200, the vaporizer 300, or the superheater 400.

The combustion gas (CG) generated from the first combustor 700 generally has a temperature of about 1000° C., which is higher than that of the exhaust gas (EG) discharged from the gas turbine 20. Therefore, by using the combustion gas (CG) with the inclusion of the separate first combustor 700, the ammonia can be effectively thermally decomposed by the decomposition reactor 500 even without using a high-performance catalyst, and the efficiency of the decomposition reactor 500 can be improved.

As such, the ammonia decomposition system 10 may include the preheater 200, the vaporizer 300, and the superheater 400, which are for heating the ammonia before the decomposition reactor 500, and the combustion gas (CG)

generated by the first combustor 700 supplies heat to the decomposition reactor 500. Accordingly, sufficient heat can be supplied to the ammonia and the ammonia can be thermally decomposed effectively.

Accordingly, there is not much residual ammonia in the decomposition gas (DG), and the residual ammonia is reliably removed through the separator 600 and the decomposition gas (DG) is supplied to the second combustor 24, thereby reducing nitrogen oxides in the exhaust gas (EG).

Separate fuel such as fossil fuel may be supplied to the first combustor 700. However, it is desirable that a portion of the decomposition gas (DG) or synthesis gas (SG) and the ammonia present in the ammonia decomposition system 10 should be supplied as fuel to the first combustor 700 in order that the system is simplified and carbon dioxide is not emitted. The first combustor 700 is also supplied with an oxidizer for combustion. For example, the air may be supplied as the oxidizer, or a portion of the exhaust gas (EG) may be supplied as the oxidizer because a large amount of residual oxygen exists in the exhaust gas (EG).

The ammonia decomposition system 10 according to the embodiment further includes the heat exchanger 800 for recovering the heat from the combustion gas (CG) that has passed through the decomposition reactor 500. Accordingly, the heat of the combustion gas (CG), which remains after being used in the decomposition reactor 500 can be effectively used. A medium that receives heat from the combustion gas (CG) in the heat exchanger 800 can be set in various ways, and thus, is not shown.

In the embodiment, the combustion gas (CG) that has passed through the heat exchanger 800 joins the exhaust gas (EG) within the heat recovery steam generator 30. The combustion gas (CG) passes through the decomposition reactor 500 and the heat exchanger 800, and then flows into the heat recovery steam generator 30. Then, the combustion gas (CG) is mixed with the flow of the exhaust gas (EG). As a result, the heat remaining after being used in the decomposition reactor 500 and the heat exchanger 800 can be finally recovered to the heat recovery steam generator 30.

A location at which the combustion gas (CG) joins the heat recovery steam generator 30 may be determined depending on the amount of heat exchange performed in the heat exchanger 800. However, it is preferable that the combustion gas (CG) should join the upstream of a selective catalytic reduction (SCR) device 31 of the heat recovery steam generator 30. That is, it is desirable to adjust the temperature of the combustion gas (CG) to an operating temperature of the selective catalytic reduction (SCR) device 31 through the heat exchanger 800. Accordingly, the combustion gas (CG) together with the exhaust gas (EG) is treated by the selective catalytic reduction device 31, and thus, nitrogen oxides can be reduced. Therefore, not only an additional stack for the combustion gas (CG) but also an additional selective catalyst reduction device is not required.

In order to solve the problem that the pressure of the combustion gas (CG) is lower than the pressure of the heat recovery steam generator 30 due to a differential pressure generated while the combustion gas (CG) passes through the decomposition reactor 500 and the heat exchanger 800, a blower 900 may be further included, which increases the pressure of the combustion gas (CG) which has passed through the decomposition reactor 500 and the heat exchanger 800, and supplies the combustion gas (CG) to the heat recovery steam generator 30.

While the drawing shows one heat exchanger 800, a plurality of the heat exchangers 800 may be provided. Also, according to the embodiment, the heat exchanger 800 may be omitted. In this case, the combustion gas (CG) that has passed through the decomposition reactor 500 may immediately join the heat recovery steam generator 30.

Figure 2:
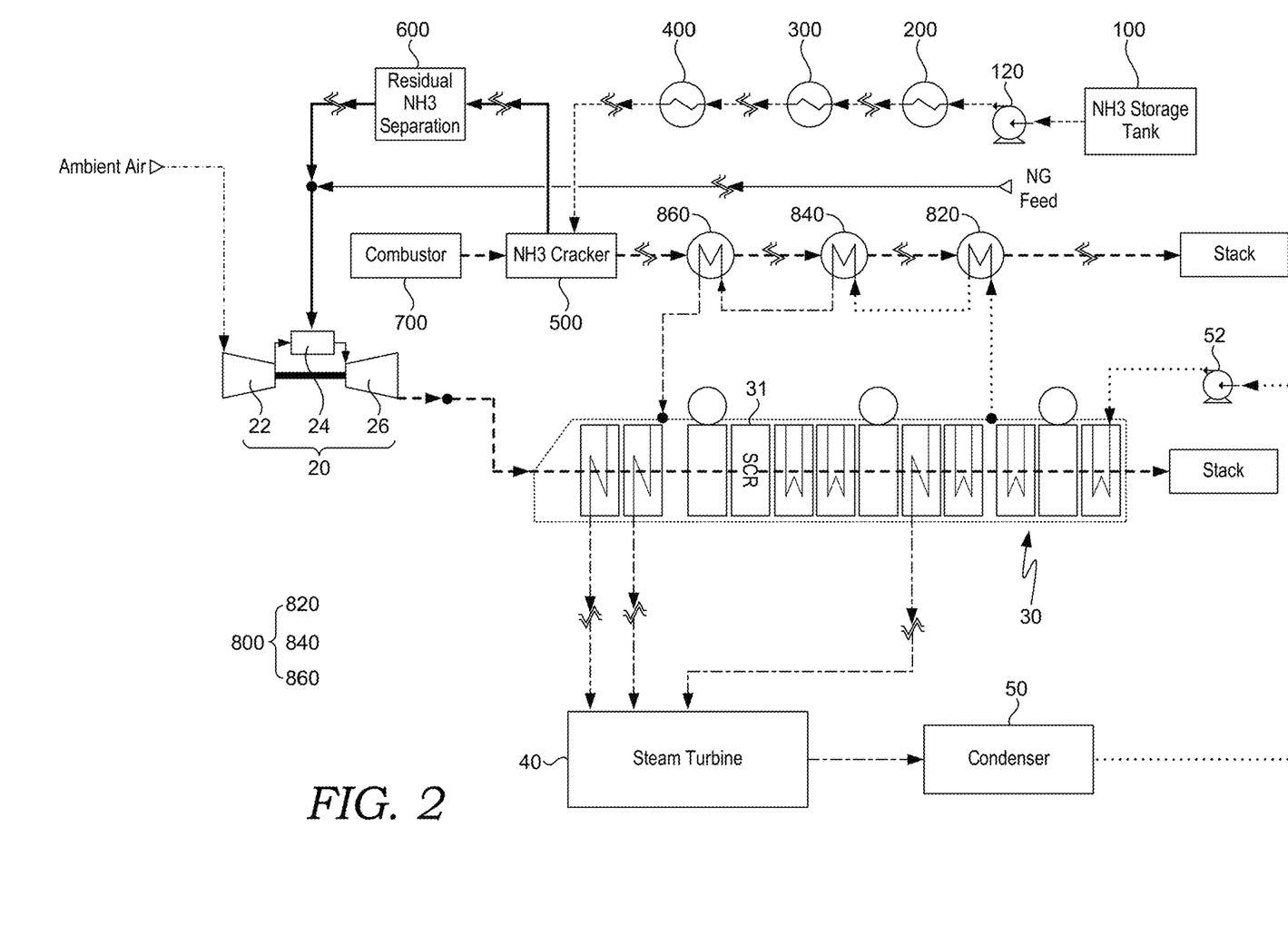
FIG. 2 is a schematic diagram of a gas turbine plant with an ammonia decomposition system according to an embodiment of the present disclosure.

FIG. 2 shows an embodiment in which a medium that receives heat the from combustion gas (CG) in the heat exchanger 800 is water extracted from the heat recovery steam generator 30. In particular, water can be extracted from downstream of a feed water pump for supplying IP and HP water in the heat recovery steam generator 30.

In the embodiment, the heat exchanger 800 includes a plurality of heat exchangers 820, 840, and 860. The plurality of heat exchangers 820, 840, and 860 are arranged in series downstream of the decomposition reactor 500 in the flow of the combustion gas (CG). Specifically, the water extracted from the heat recovery steam generator 30 is heated by combustion gas (CG) while passing through the first heat exchanger 820, and then is additionally heated and vaporized by the combustion gas (CG) while passing through the second heat exchanger 840. Then, the water is additionally heated and superheated by the combustion gas (CG) while passing through the third heat exchanger 860. The first heat exchanger 820 functions as an economizer, the second heat exchanger 840 functions as an evaporator, and the third heat exchanger 860 functions as a superheater. The steam superheated by the third heat exchanger 860 is recovered back to the heat recovery steam generator 30. However, the embodiment is not limited to this, and the steam superheated by the third heat exchanger 860 may be recovered to the upstream of the steam turbine 40 and may enter, together with the steam generated by the heat recovery steam generator 30, the steam turbine 40.

According to this, the heat of the combustion gas (CG), which remains after being used in the decomposition reactor 500 is recovered by using the water of the heat recovery steam generator 30, thereby improving the power generation efficiency.

Figure 1:
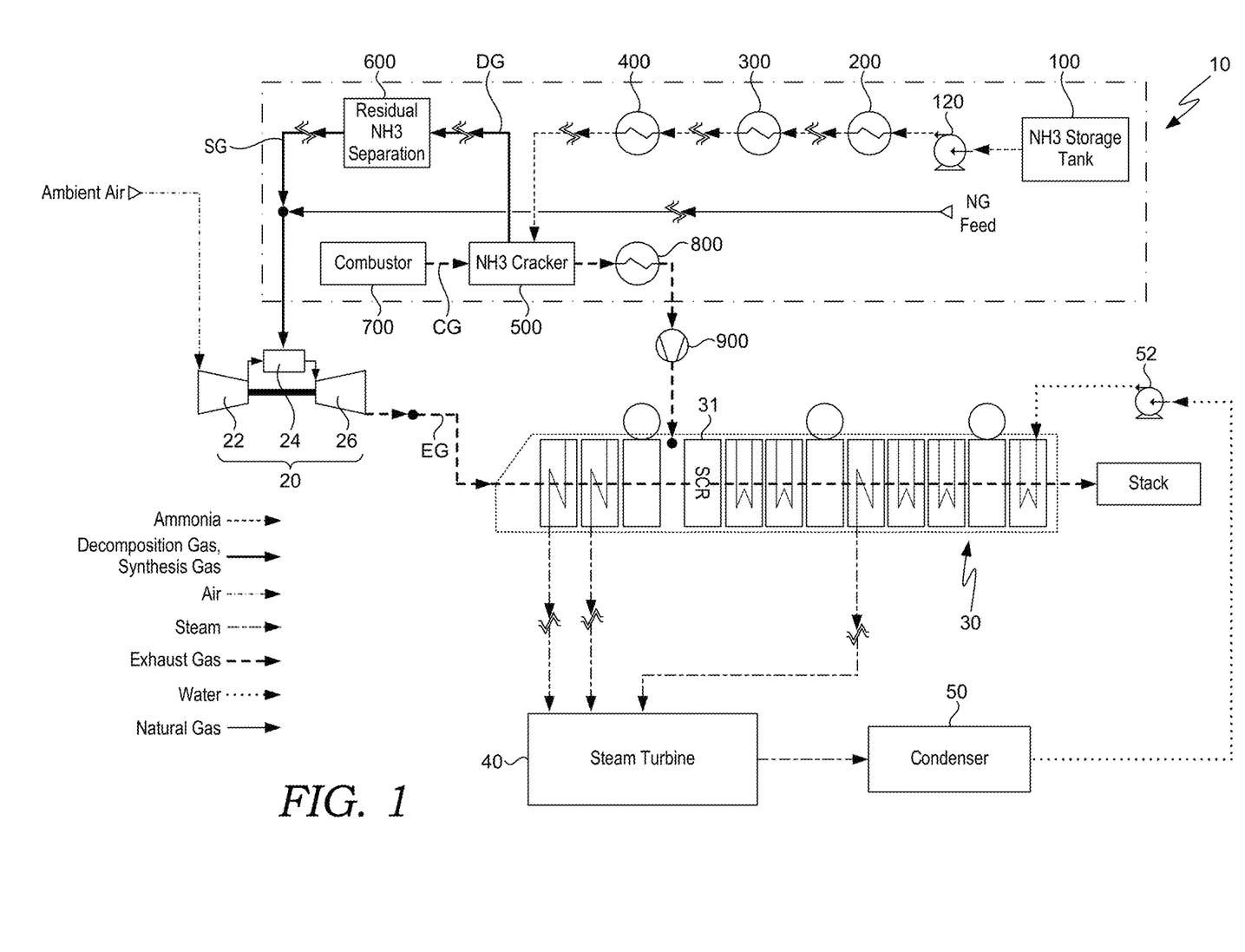
FIG. 1 is a schematic diagram of a gas turbine plant with an ammonia decomposition system according to an embodiment of the present disclosure.

While the embodiment shows that a stack for the combustion gas (CG) is provided, it is possible that the combustion gas (CG) that has passed through the heat exchanger 800 can join, as shown in the embodiment shown in FIG. 1, the exhaust gas (EG) within the heat recovery steam generator 30.

Figure 3:
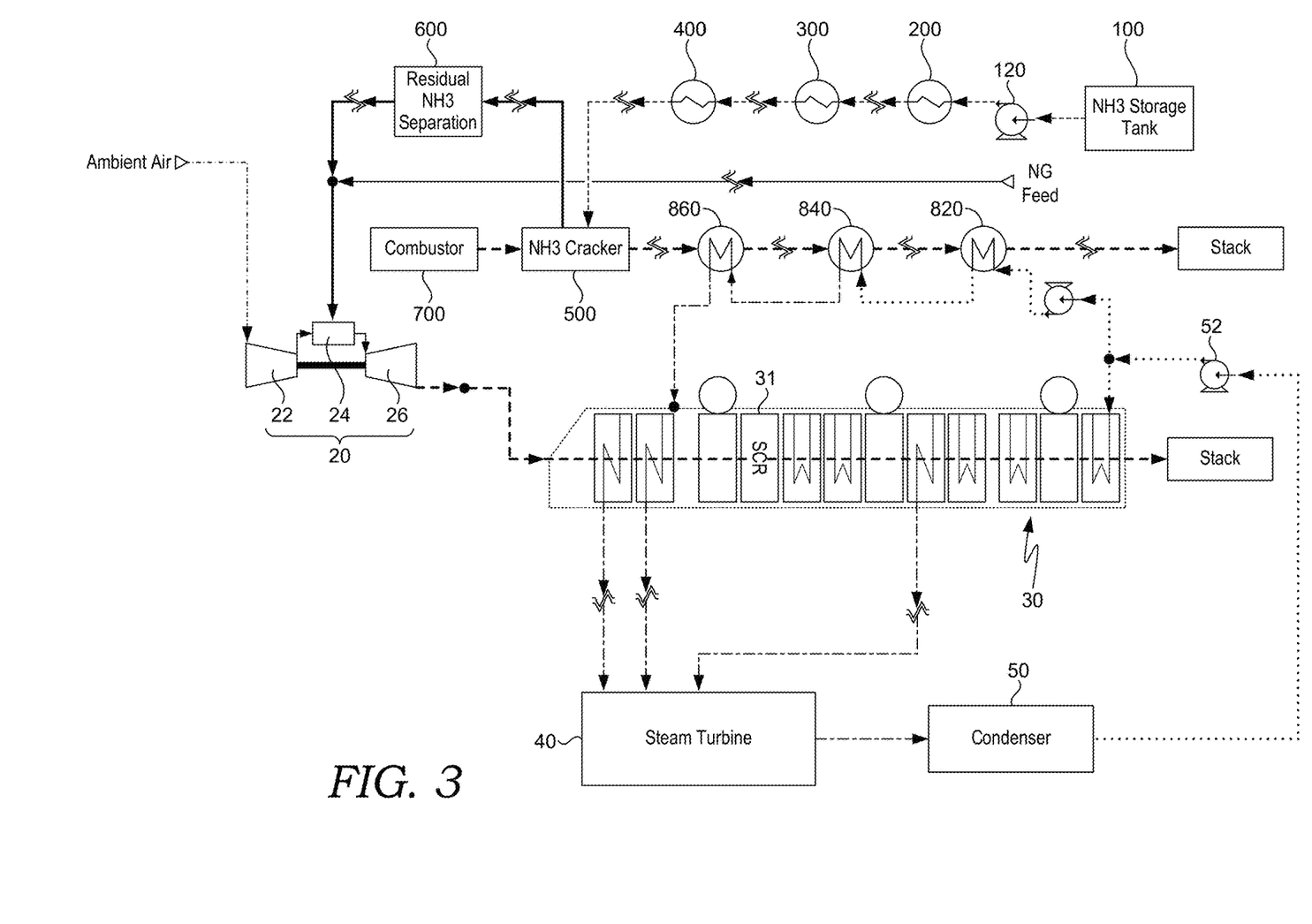
FIG. 3 is a schematic diagram of a gas turbine plant with an ammonia decomposition system according to an embodiment of the present disclosure.

FIG. 3 shows an embodiment in which the medium that receives heat from the combustion gas (CG) in the heat exchanger 800 is water extracted from downstream of the condenser 50. That is, a portion of the water condensed in the condenser 50 branches out from the downstream of the condenser 50 and flows into the first heat exchanger 820.

In this case, since the water does not pass through an integrated deaerator that is usually installed in an LP drum of the heat recovery steam generator 30, it may be necessary to perform sufficient deaeration within the condenser 50 through a deaerating condenser, or to install an additional deaerator on the path of the water flowing into the first heat exchanger 820 or in the first heat exchanger 820.

Figure 4:
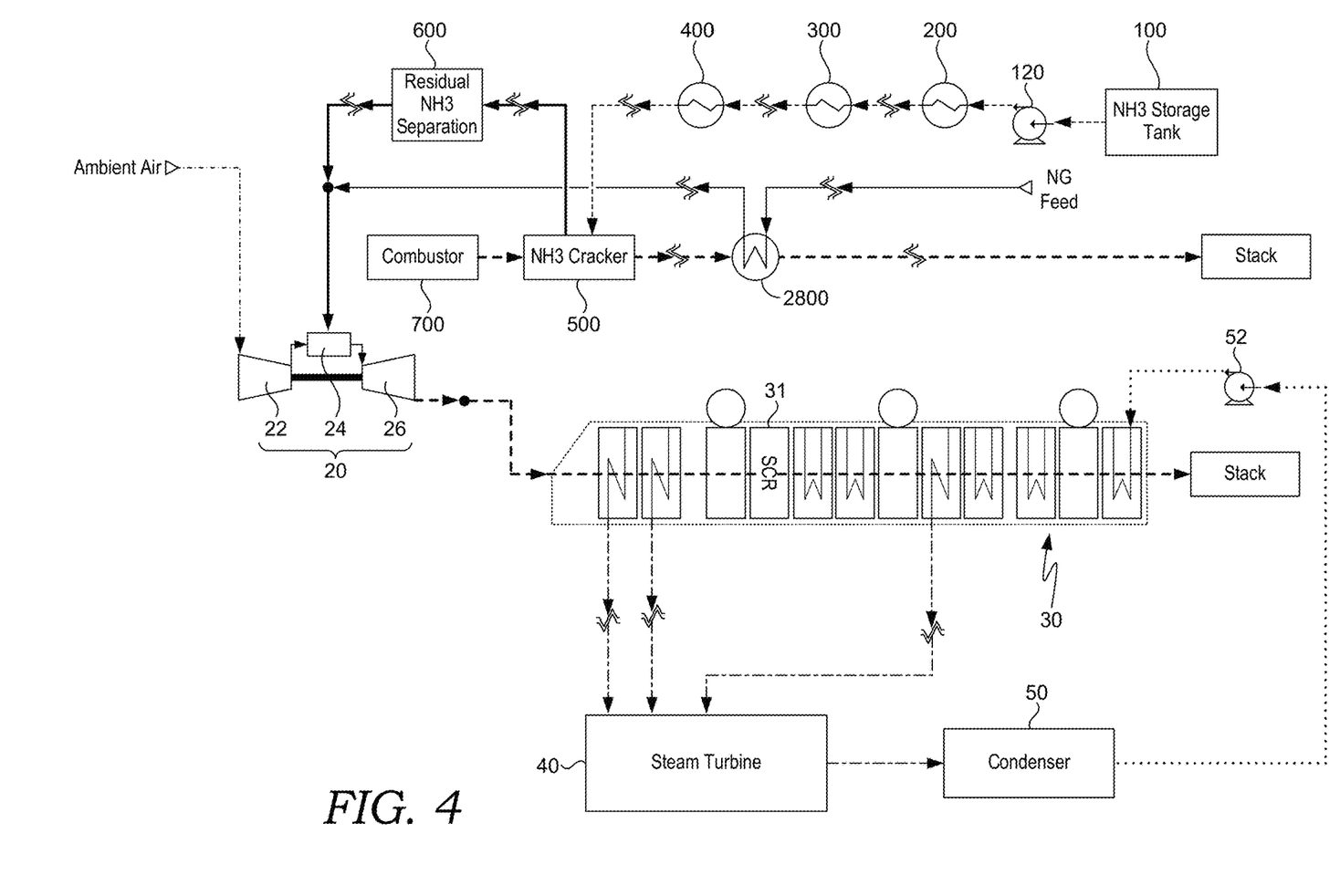
FIG. 4 is a schematic diagram of a gas turbine plant with an ammonia decomposition system according to an embodiment of the present disclosure.

FIG. 4 shows an embodiment in which a medium that receives heat from the combustion gas (CG) in a heat exchanger 2800 is natural gas (NG). However, the embodiment is not limited to this. The synthesis gas (SG) discharged from the separator 600 or a mixture of the synthesis gas (SG) and natural gas (NG) may be supplied to the heat exchanger 2800.

The natural gas (NG) is heated by the combustion gas (CG) in the heat exchanger (2800) before being supplied to the second combustor 24. As the heat of the combustion gas (CG), which remains after being used in the decomposition reactor 500 is used to preheat the natural gas (NG), the amount of fuel used for a target temperature of the combustion gas in the second combustor 24 is reduced, so that the efficiency can be improved.

Figure 5:
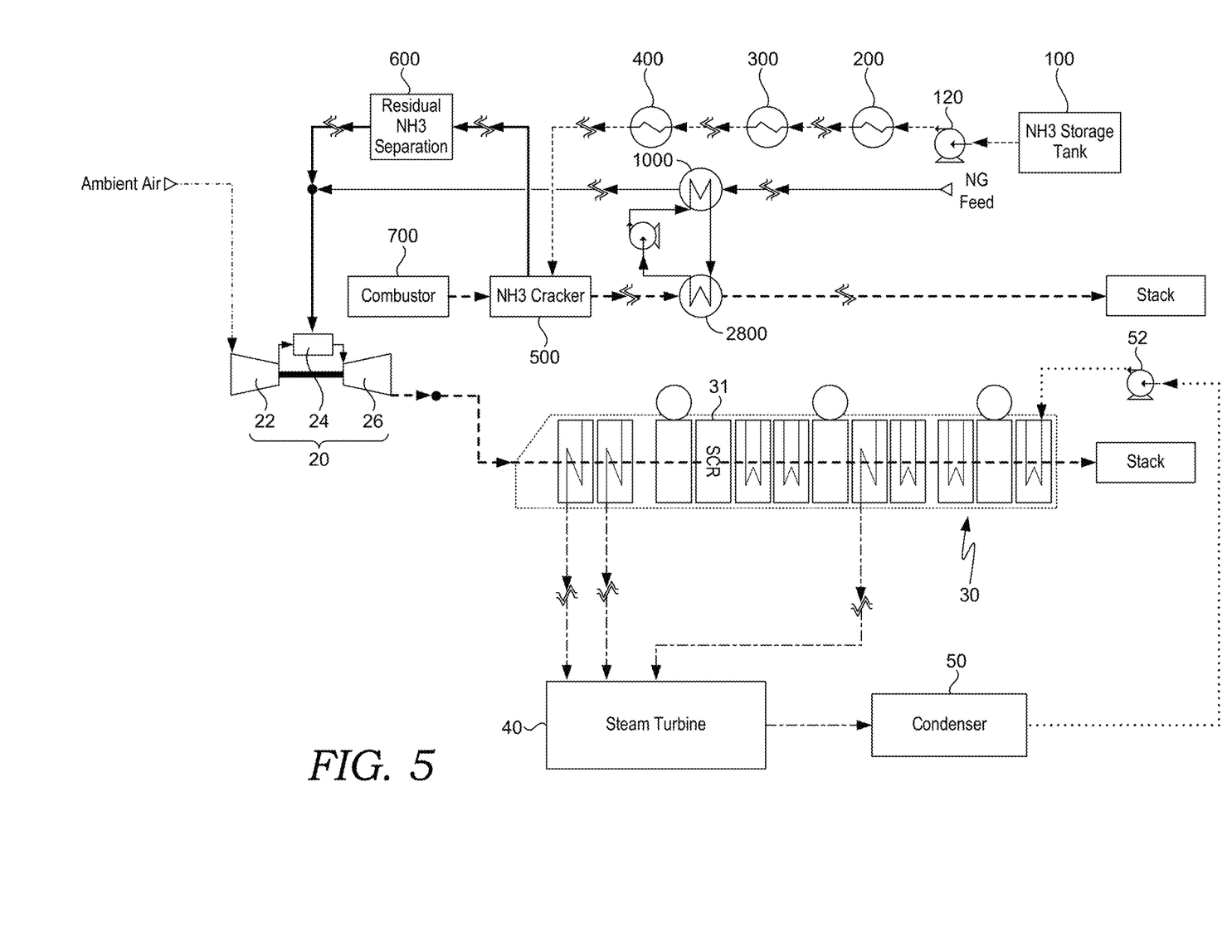
FIG. 5 is a schematic diagram of a gas turbine plant with an ammonia decomposition system according to an embodiment of the present disclosure.

FIG. 5 shows an embodiment in which the combustion gas (CG) and natural gas (NG) exchange heat indirectly through a heat transfer fluid. Specifically, the heat transfer fluid absorbs heat from the combustion gas (CG) in the heat exchanger 2800 and then supplies the heat to the natural gas (NG) in a separate fourth heat exchanger 1000. Needless to say, the heat transfer fluid can supply the heat to the synthesis gas (SG) instead of the natural gas (NG) or to a mixture of the synthesis gas (SG) and natural gas (NG). Through this, problems caused by leakage in direct heat exchange can be prevented.

Figure 6:
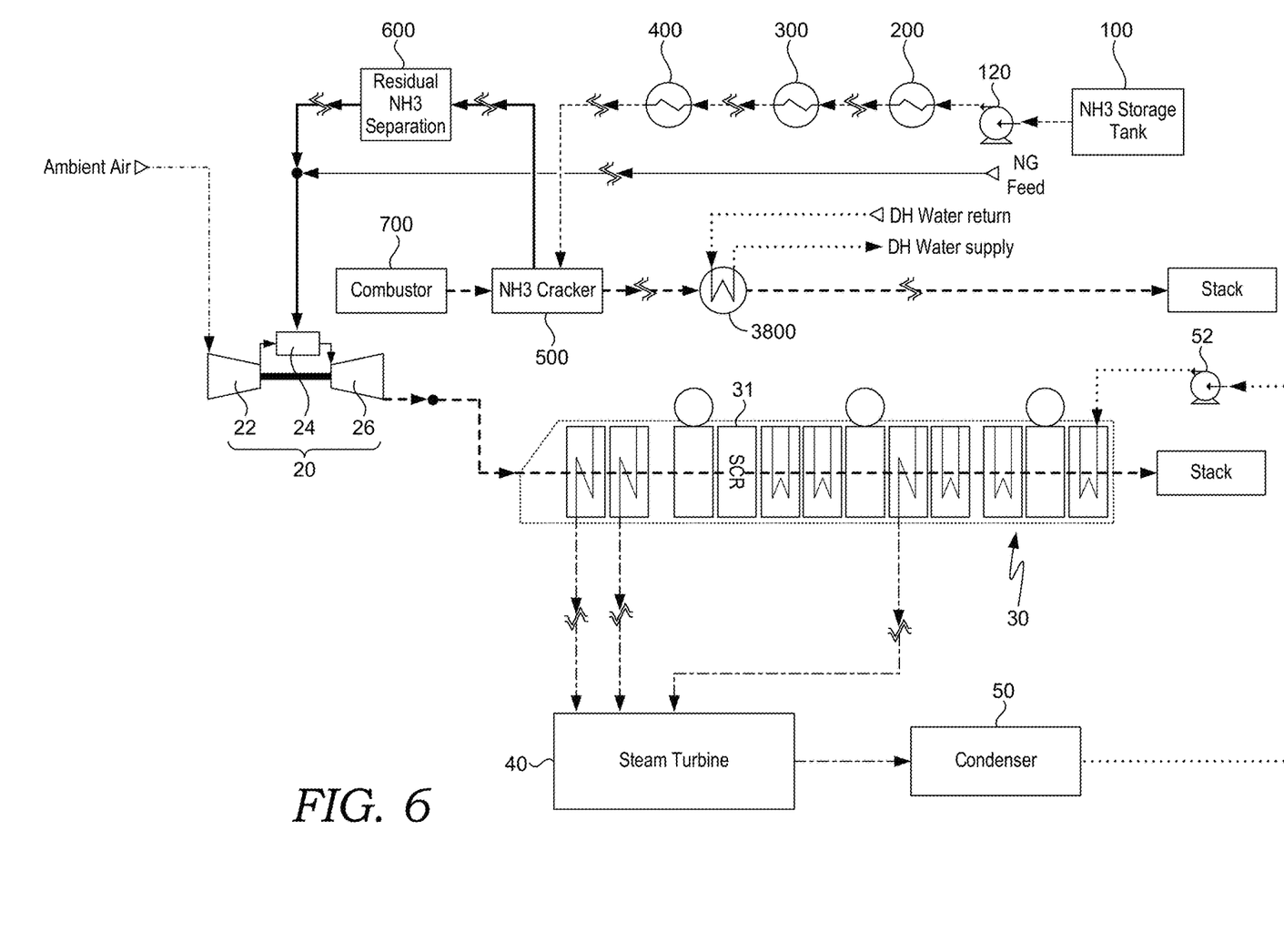
FIG. 6 is a schematic diagram of a gas turbine plant with an ammonia decomposition system according to an embodiment of the present disclosure.

FIG. 6 shows an embodiment in which the medium that receives heat from the combustion gas (CG) in a heat exchanger 3800 is district heating (DH) water. The district heating water of which the temperature has decreased after district heating is supplied to the heat exchanger 3800 and is heated by the combustion gas (CG). After being heated, the district heating water may be supplied again for district heating. According to this, the heat of the combustion gas (CG), which remains after being used in the decomposition reactor 500 is used as a heat source for district heating. Therefore, it is not necessary to be connected with the power generation of the heat recovery steam generator 30, etc., which results in a simpler system.

Figure 7:
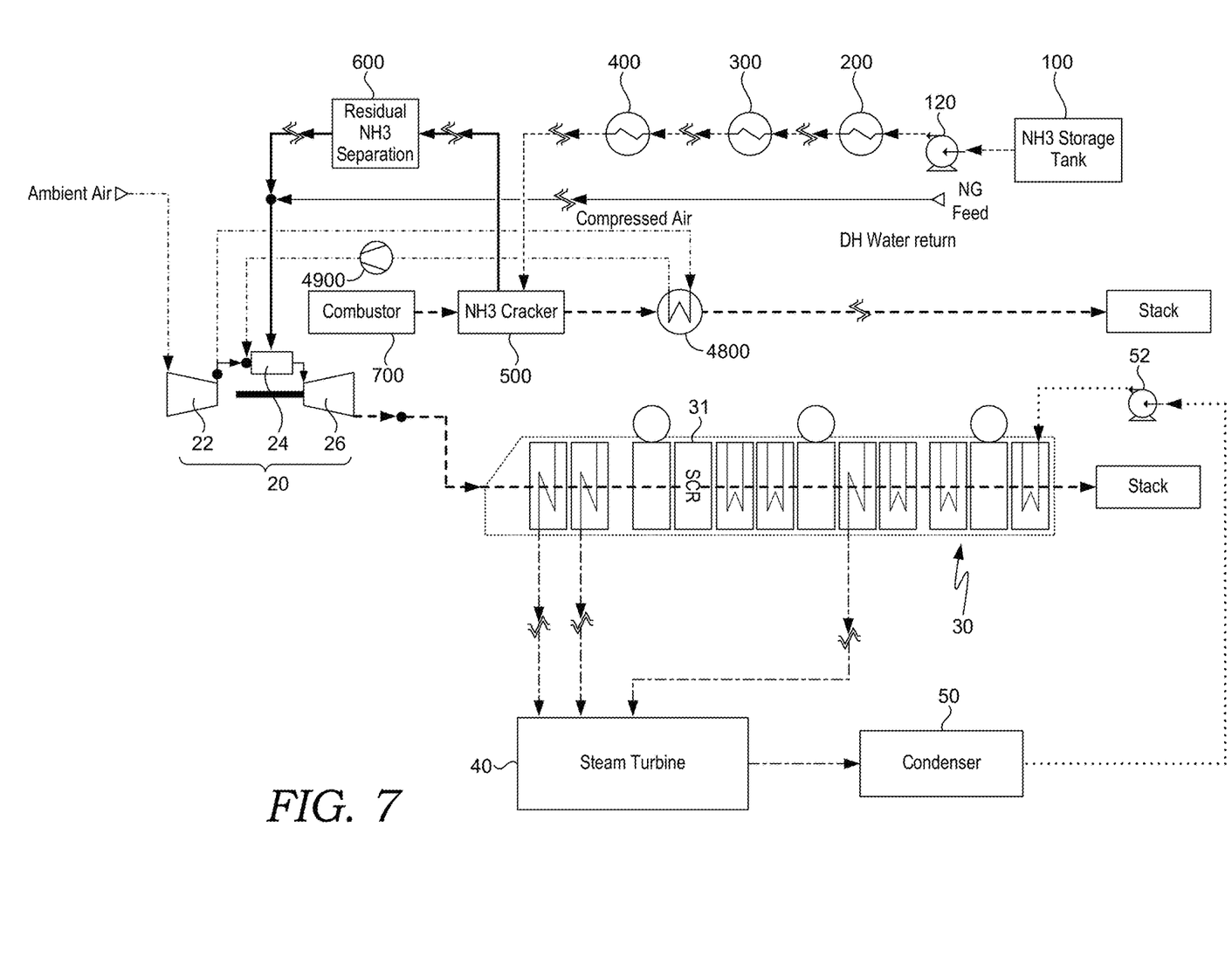
FIG. 7 is a schematic diagram of a gas turbine plant with an ammonia decomposition system according to an embodiment of the present disclosure.

FIG. 7 shows an embodiment in which the medium that receives heat from the combustion gas (CG) in a heat exchanger 4800 is compressed air which is supplied to the second combustor 24. The air compressed by the compressor 22 of the gas turbine is heated by the combustion gas (CG) in the heat exchanger 4800 before being supplied to the second combustor 24. All of the air compressed by the compressor 22 of the gas turbine may be supplied to the second combustor 24 after passing through the heat exchanger 4800. Alternatively, as shown in FIG. 7, a portion of the air compressed by the compressor 22 of the gas turbine may be branched and pass through the heat exchanger 4800, and then may be supplied to the second combustor 24. As such, in the heating of the compressed air which is supplied to the second combustor 24, the amount of fuel used for a target temperature of the combustion gas in the second combustor 24 can be reduced.

In some cases, a separate booster compressor 4900 may be installed downstream of the heat exchanger 4800 in the flow of the compressed air in preparation for a case where the pressure of the compressed air decreases as the compressed air passes through the heat exchanger 4800. The booster compressor 4900 increases the pressure of the compressed air heated in the heat exchanger 4800 and supplies the compressed air to the second combustor 24.

Although it has been described above that there is one medium that receives heat from the combustion gas (CG) in the heat exchanger, there may be a plurality of heat exchangers and mediums that receive heat from the combustion gas (CG) in the heat exchangers may be set differently from each other. For example, the compressed air may be heated by the combustion gas (CG) in one heat exchanger, and the water extracted from the heat recovery steam generator 30 may be heated by the combustion gas (CG) in another heat exchanger.

Figure 8:
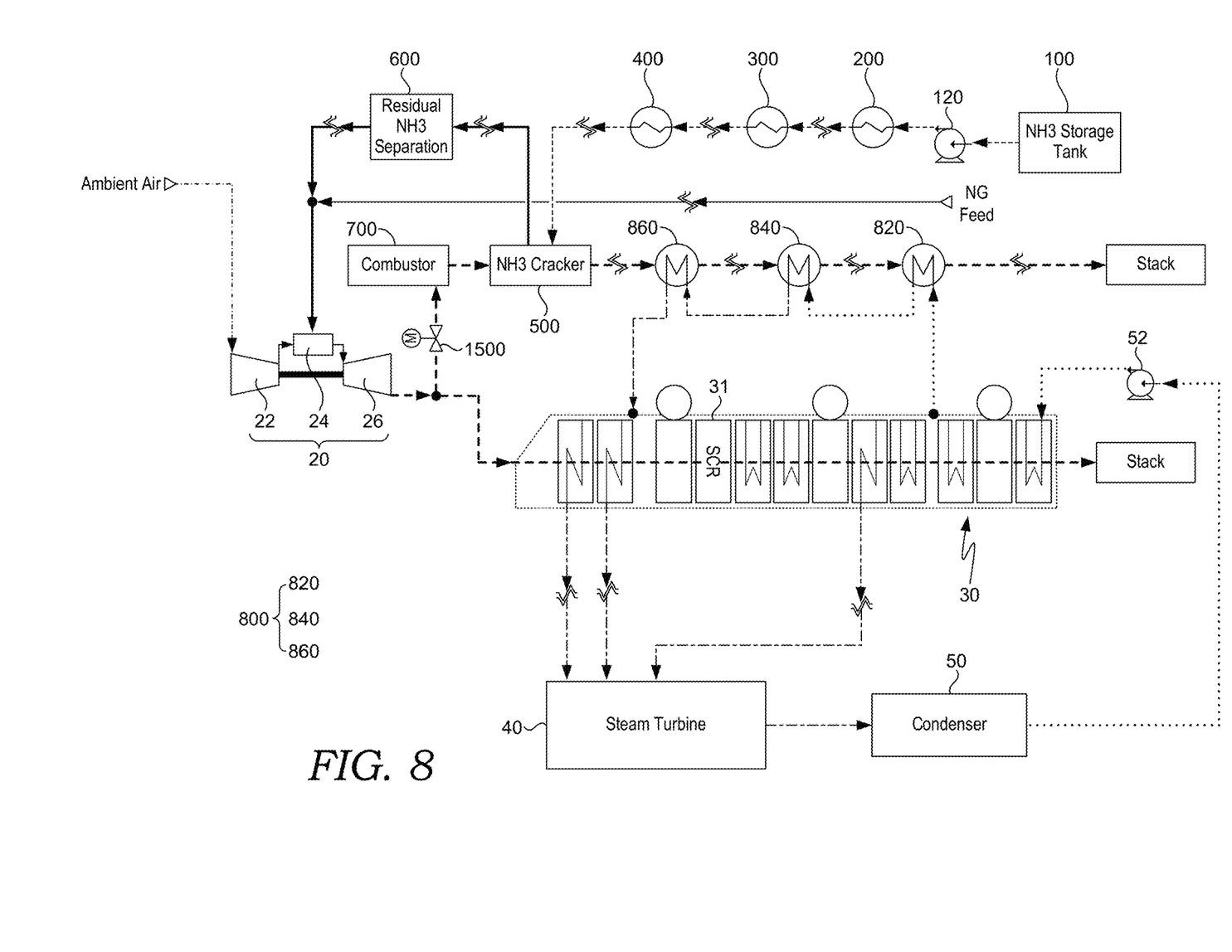
FIG. 8 is a schematic diagram of a gas turbine plant with an ammonia decomposition system according to an embodiment of the present disclosure.

Next, according to the embodiment shown in FIG. 8, a portion of the exhaust gas (EG) discharged from the gas turbine 20 is branched and supplied to the first combustor 700. Since a large amount of residual oxygen exists in the exhaust gas (EG), the exhaust gas (EG) may serve as an oxidizer in the first combustor 700. In this case, the exhaust gas (EG) may replace a portion or all of the supply amount of the air that is separately supplied as an oxidizer to the first combustor 700. For example, when the gas turbine plant is started, the full amount of the air is supplied as an oxidizer to the first combustor 700. When the gas turbine plant is normally operated, the full amount of the exhaust gas (EG) is supplied as an oxidizer to the first combustor 700. Also, since the temperature of the exhaust gas (EG) is higher than that of the air, not only the amount of fuel consumed by the first combustor 700 can be reduced but also a thermal decomposition efficiency of the ammonia can be improved. Here, a fourth flow control valve 1500 is installed in a branch line for branching a portion of the exhaust gas (EG) discharged from the gas turbine 20, so that a flow rate of the exhaust gas (EG) which branches into the first combustor 700 can be controlled. Although FIG. 8 shows that the above features is applicable to the embodiment of FIG. 2, the above feature is not limited thereto and can be applied to other embodiments as well.

Next, a gas turbine plant including an ammonia decomposition system according to another embodiment of the present disclosure will be described with reference to FIG. 9.

Likewise, the gas turbine plant of the embodiment also generally includes the ammonia decomposition system 10, the gas turbine 20, the heat recovery steam generator 30, the steam turbine 40, and the condenser 50. In FIG. 9, the steam turbine 40 and the condenser 50 are omitted. Hereinafter, the following description will focus on only differences from the embodiment shown in FIG. 1. The components identical to the components of FIG. 1 are denoted by the same reference numerals.

The ammonia decomposition system 10 includes the storage tank 100, the supply pump 120, the preheater 200, the vaporizer 300, the superheater 400, the decomposition reactor 500, the separator 600, the first combustor 700, and the heat exchanger 800. They are the same as those described in FIG. 1. A medium that receives heat from the combustion gas (CG) in the heat exchanger 800 can be set in various ways, and thus, is not shown. The gas turbine 20, the heat recovery steam generator 30, the steam turbine 40, and the condenser 50 are also the same as those described in FIG. 1.

In this embodiment, a portion of the synthesis gas (SG) discharged from the separator 600 is supplied to the first combustor 700 and is combusted. As such, a portion of the synthesis gas (SG) is supplied as fuel to the first combustor 700, no separate fuel such as fossil fuel is required. For this purpose, a synthetic gas discharge line L1 through which the synthetic gas (SG) discharged from the separator 600 flows branches into a first branch line L11 connected to the first combustor 700 and a second branch line L12 connected to the second combustor 24. Here, a first flow control valve 1210 is installed in the first branch line L11, especially at the inlet side of the first branch line L11 and controls the flow rate of the synthesis gas (SG) branched into the first branch line L11.

In the embodiment, in order to maintain the amount of fuel supplied to the first combustor 700 and the second combustor 24 constant, a bypass line L13 is provided, which extends from the synthesis gas discharge line L1 to the second branch line L12. A buffer tank 1100 is provided in the bypass line L13.

A second flow control valve 1220 which controls the flow rate of the synthetic gas (SG) branched into the bypass line L13 is installed upstream of the buffer tank 1100 in the bypass line L13, especially at the inlet side of the bypass line L13. Accordingly, in a state where the amount of fuel supplied to the first combustor 700 is set constant, when the amount of fuel produced by the decomposition reactor 500 (the amount of the synthesis gas) exceeds the amount of fuel required by the second combustor 24, the second flow control valve 1220 is opened and the fuel may be stored in the buffer tank 1100. A third flow control valve 1230 is also installed downstream of the buffer tank 1100 in the bypass line L13. When fuel is intended to be stored in the buffer tank 1100, the third flow control valve 1230 would be closed. On the other hand, when the amount of fuel produced by the decomposition reactor 500 (the amount of the synthesis gas) is less than the amount of fuel required by the second combustor 24, the second flow control valve 1220 is closed and the third flow control valve 1230 is opened, and then the fuel stored in the buffer tank 1100 may be additionally supplied to the second combustor 24.

Here, in order to compensate for the pressure loss that occurs as the synthetic gas (SG) passes through the buffer tank 1100 and the second and third flow control valves 1220 and 1230, a blower 1400 which increases the pressure of the synthetic gas (SG) may be additionally provided in the bypass line L13.

Figure 9:
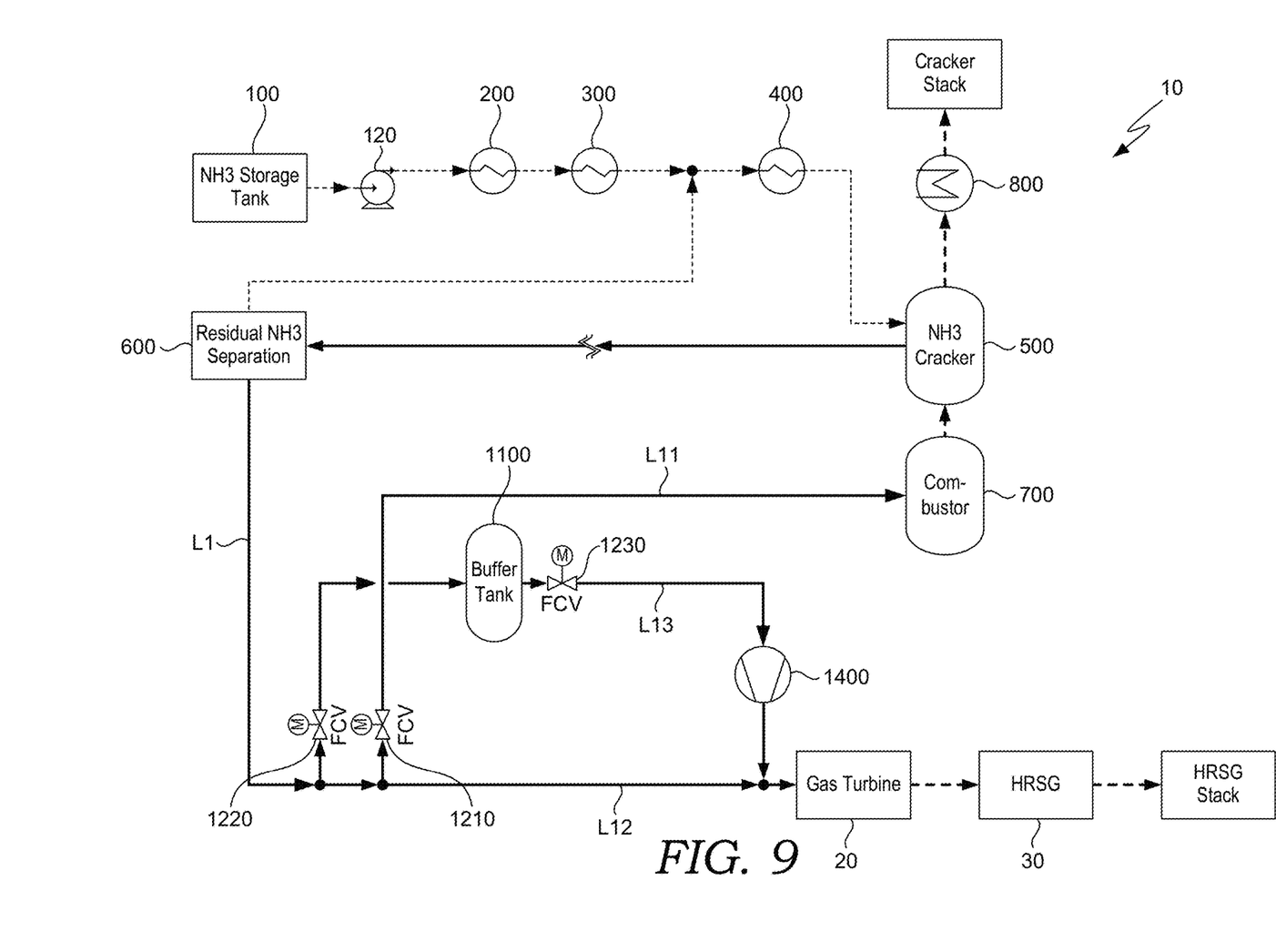
FIG. 9 is a schematic diagram of a gas turbine plant with an ammonia decomposition system according to an embodiment of the present disclosure.
Figure 10:
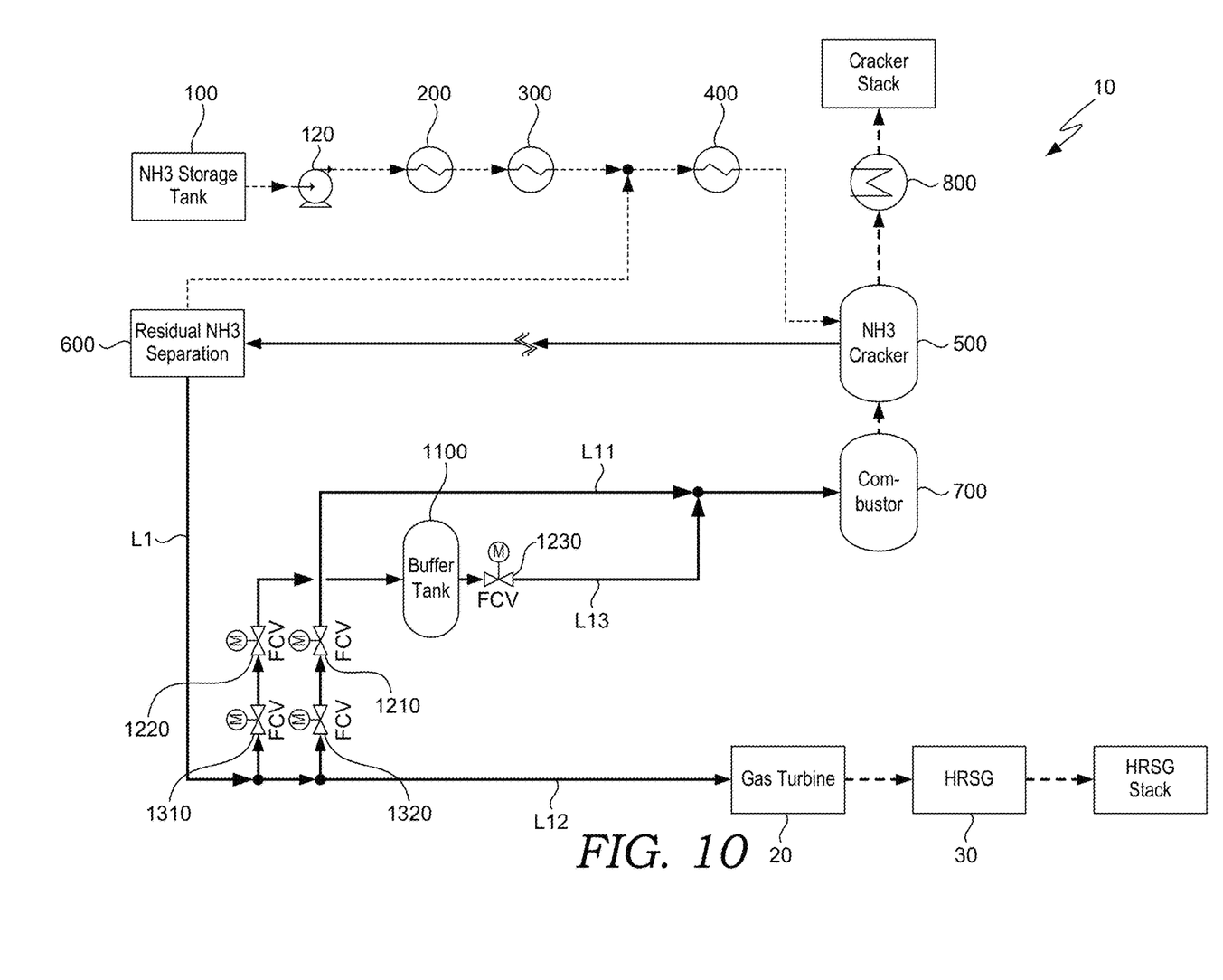
FIG. 10 is a schematic diagram of a gas turbine plant with an ammonia decomposition system according to an embodiment of the present disclosure.

According to the embodiment shown in FIG. 10, since the synthetic gas discharge line L1 is branched into the first branch line L11 and the second branch line L12 in the same manner as described in FIG. 9, a portion of the synthesized gas (SG) discharged from the separator 600 is supplied to the first combustor 700 and is combusted. Here, the first flow control valve 1210 is installed in the first branch line L11, especially at the inlet side of the first branch line L11 and controls the flow rate of the synthesis gas (SG) branched into the first branch line L11.

However, unlike FIG. 9, the bypass line L13 is provided, which extends from the synthesis gas discharge line L1 to the first branch line L11. The buffer tank 1100 is provided in the bypass line L13.

The second flow control valve 1220 which controls the flow rate of the synthetic gas (SG) branched into the bypass line L13 is installed upstream of the buffer tank 1100 in the bypass line L13, especially at the inlet side of the bypass line L13. Accordingly, in a state where the amount of fuel supplied to the second combustor 24 is set constant, when the amount of fuel produced by the decomposition reactor 500 (the amount of the synthesis gas) exceeds the amount of fuel required by the first combustor 700, the second flow control valve 1220 is opened and the fuel may be stored in the buffer tank 1100. The third flow control valve 1230 is also installed downstream of the buffer tank 1100 in the bypass line L13. When fuel is intended to be stored in the buffer tank 1100, the third flow control valve 1230 would be closed. On the other hand, when the amount of fuel produced by the decomposition reactor 500 (the amount of the synthesis gas) is less than the amount of fuel required by the first combustor 700, the second flow control valve 1220 is closed and the third flow control valve 1230 is opened, and then the fuel stored in the buffer tank 1100 may be additionally supplied to the first combustor 700.

Here, unlike the second combustor 24, fuel does not need to be supplied to the first combustor 700 at a high pressure, so that there is no reason to store the fuel in the buffer tank 1100 at a high pressure. Therefore, a first pressure control valve 1310 may be installed upstream of the buffer tank 1100 in the bypass line L13. In this case, the pressure of the synthetic gas (SG) is lowered by the first pressure control valve 1310 and then is stored in the buffer tank 1100.

Also, in this case, a second pressure control valve 1320 may also be installed in the first branch line L11 such that the synthetic gas (SG) supplied from the buffer tank 1100 can join the first branch line L11. The second pressure control valve 1320 may match the pressure of the synthesis gas (SG) in the first branch line L11 to the pressure the synthesis gas (SG) supplied from the buffer tank 1100 at the same level.

The present invention is not limited to the described specific embodiments and descriptions described above. Various modifications can be made by anyone skilled in the art without departing from the subject matter of the present invention as defined by the appended claims. Such modifications fall within the scope of protection of the present invention.

| REFERENCE NUMERALS | |
|---|---|
| 10: Ammonia Decomposition System | 20: Gas Turbine |
| 22: Compressor | 24: Second Combustor |
| 26: Turbine | 30: Heat recovery steam generator |
| 31: Selective Catalytic Reduction Device | 40: Steam Turbine |
| 50: Condenser | 52: Condensate Pump |
| 100: Storage Tank | 120: Supply Pump |
| 200: Preheater | 300: Vaporizer |
| 400: Superheater | 500: Decomposition Reactor |
| 600: Separator | 700: First Combustor |
| 800, 2800, 3800, 4800: Heat Exchanger | 820: First Heat Exchanger |
| 840: Second Heat Exchanger | 860: Third Heat Exchanger |
| 900: Blower | 1000: Fourth Heat Exchanger |
| 1100: Buffer Tank | 1210: First Flow control valve |
| 1220: Second Flow control valve | 1230: Third Flow control valve |
| 1310: First Pressure Control Valve | 1320: Second Pressure Control Valve |
| 1400: Blower | 1500: Fourth Flow control valve |
| 4900: Booster Compressor | L1: Synthetic Gas Discharge Line |
| L11: First Branch Line | L12: Second Branch Line |
| L13: Bypass Line | |

What is claimed is:

1. A gas turbine plant with an ammonia decomposition system, the gas turbine plant comprising:
   a storage tank configured to store liquid ammonia;
   a supply pump configured to supply the liquid ammonia of the storage tank;
   a preheater configured to preheat the liquid ammonia supplied by the supply pump;
   a vaporizer configured to vaporize the liquid ammonia preheated by the preheater;
   a superheater configured to superheat the gaseous ammonia vaporized by the vaporizer;
   a decomposition reactor configured to thermally decompose the gaseous ammonia superheated by the superheater;
   a separator configured to separate residual ammonia from the decomposition gas decomposed by the decomposition reactor;
   a first combustor configured to generate combustion gas in such a way as to supply heat to the decomposition reactor; and
   a heat exchanger configured to recover the heat from the combustion gas that has passed through the decomposition reactor,
   wherein synthesis gas consisting of hydrogen and nitrogen with the residual ammonia removed by the separator is supplied to a second combustor of a gas turbine.

2. The gas turbine plant with the ammonia decomposition system of claim 1,
wherein exhaust gas that is discharged from the gas turbine is supplied to a heat recovery steam generator, and
wherein the combustion gas that has passed through the heat exchanger joins the exhaust gas within the heat recovery steam generator.

3. The gas turbine plant with the ammonia decomposition system of claim 2, wherein the combustion gas joins the exhaust gas upstream of a selective catalytic reduction device of the heat recovery steam generator.

4. The gas turbine plant with the ammonia decomposition system of claim 2, further comprising a blower which increases a pressure of the combustion gas which has passed through the decomposition reactor and the heat exchanger, and supplies the combustion gas to the heat recovery steam generator.

5. The gas turbine plant with the ammonia decomposition system of claim 1, wherein the heat exchanger includes a plurality of heat exchangers and the plurality of heat exchangers is arranged in series downstream of the decomposition reactor in a flow of the combustion gas.

6. The gas turbine plant with the ammonia decomposition system of claim 1,
wherein exhaust gas that is discharged from the gas turbine is supplied to a heat recovery steam generator, and steam generated by heat of the exhaust gas in the heat recovery steam generator is supplied to a steam turbine, drives the steam turbine, and then flows into a condenser, and wherein water condensed in the condenser is supplied back to the heat recovery steam generator, and
wherein the water extracted from downstream of the condenser or from the heat recovery steam generator is supplied to the heat exchanger and is supplied with heat from the combustion gas, and then is recovered to the heat recovery steam generator or upstream of the steam turbine.

7. The gas turbine plant with the ammonia decomposition system of claim 1, wherein natural gas, together with the synthesis gas, is supplied to the second combustor.

8. The gas turbine plant with the ammonia decomposition system of claim 7, wherein the synthesis gas or the natural gas is supplied to the heat exchanger before being supplied to the second combustor and is heated by the combustion gas.

9. The gas turbine plant with the ammonia decomposition system of claim 7, wherein a heat transfer fluid absorbs the heat from the combustion gas in the heat exchanger and supplies the heat to the synthesis gas or to the natural gas.

10. The gas turbine plant with the ammonia decomposition system of claim 1, wherein district heating water is supplied to the heat exchanger and is heated by the combustion gas.

11. The gas turbine plant with the ammonia decomposition system of claim 1, wherein air compressed by a compressor of the gas turbine is supplied to the heat exchanger before being supplied to the second combustor and is heated by the combustion gas.

12. The gas turbine plant with the ammonia decomposition system of claim 11, further comprising a booster compressor which increases a pressure of the compressed air heated in the heat exchanger.

13. The gas turbine plant with the ammonia decomposition system of claim 1, wherein a portion of exhaust gas discharged from the gas turbine is branched and supplied to the first combustor.

14. The gas turbine plant with the ammonia decomposition system of claim 1,
wherein a portion of the synthesis gas is supplied to the first combustor and is combusted,
wherein a synthetic gas discharge line through which the synthetic gas discharged from the separator flows branches into a first branch line connected to the first combustor and a second branch line connected to the second combustor,
wherein a bypass line is provided, which extends from the synthesis gas discharge line to the second branch line, and
wherein a buffer tank is provided in the bypass line.

15. The gas turbine plant with the ammonia decomposition system of claim 14, wherein a blower which increases a pressure of the synthetic gas is provided in the bypass line.

16. The gas turbine plant with the ammonia decomposition system of claim 14, wherein a flow control valve (FCV) is installed in the first branch line and upstream and downstream of the buffer tank in the bypass line, respectively.

17. The gas turbine plant with the ammonia decomposition system of claim 1,
wherein a portion of the synthesis gas is supplied to the first combustor and is combusted,
wherein a synthetic gas discharge line through which the synthetic gas discharged from the separator flows branches into a first branch line connected to the first combustor and a second branch line connected to the second combustor,
wherein a bypass line is provided, which extends from the synthesis gas discharge line to the first branch line, and
wherein a buffer tank is provided in the bypass line.

18. The gas turbine plant with the ammonia decomposition system of claim 17, wherein a pressure control valve (PCV) is installed in the first branch line and upstream of the buffer tank in the bypass line, respectively.

19. The gas turbine plant with the ammonia decomposition system of claim 17, wherein a flow control valve (FCV) is installed in the first branch line and upstream and downstream of the buffer tank in the bypass line, respectively.

20. A gas turbine plant with an ammonia decomposition system, the gas turbine plant comprising:
a storage tank configured to store liquid ammonia;
a supply pump configured to supply the liquid ammonia of the storage tank;
a preheater configured to preheat the liquid ammonia supplied by the supply pump;
a vaporizer configured to vaporize the liquid ammonia preheated by the preheater;
a superheater configured to superheat the gaseous ammonia vaporized by the vaporizer;
a decomposition reactor configured to thermally decompose the gaseous ammonia superheated by the superheater;
a separator configured to separate residual ammonia from the decomposition gas decomposed by the decomposition reactor; and
a first combustor configured to generate combustion gas in such a way as to supply heat to the decomposition reactor,
wherein synthesis gas consisting of hydrogen and nitrogen with the residual ammonia removed by the separator is supplied to a second combustor of a gas turbine, wherein exhaust gas that is discharged from the gas turbine is supplied to a heat recovery steam generator, and wherein the combustion gas joins the exhaust gas within the heat recovery steam generator.

\* \* \* \* \*